O. R. TAKA.
MOTION PICTURE CAMERA AND PROJECTOR.
APPLICATION FILED MAY 31, 1916.
1,309,665.
Patented July 15, 1919.
4 SHEETS—SHEET 1.
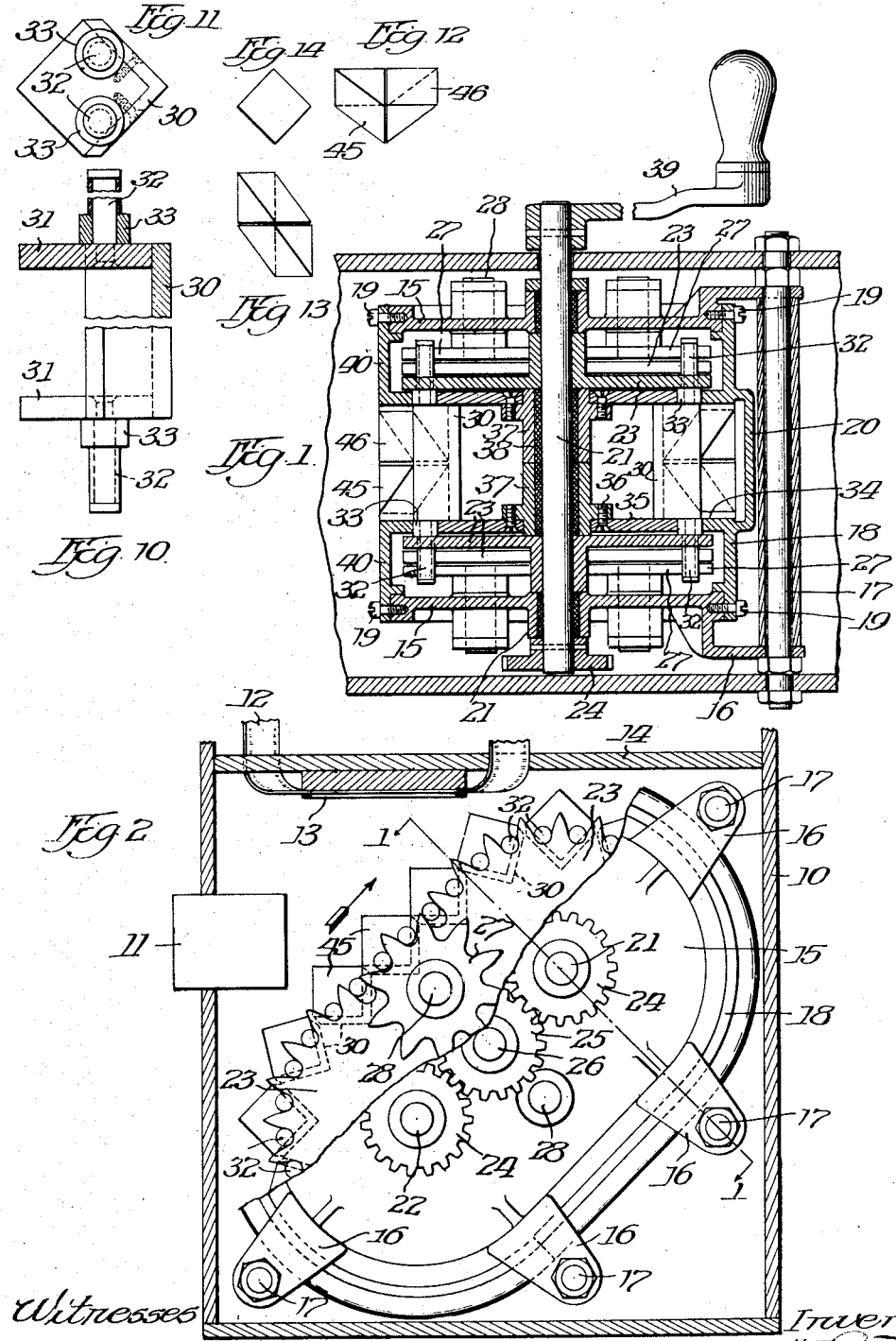

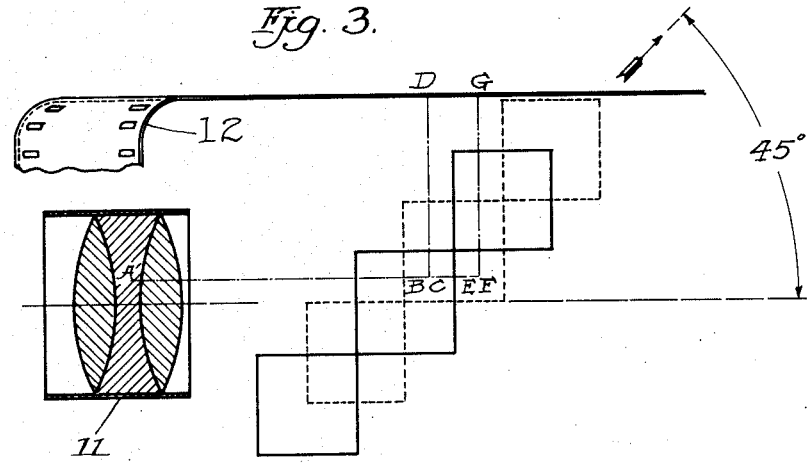
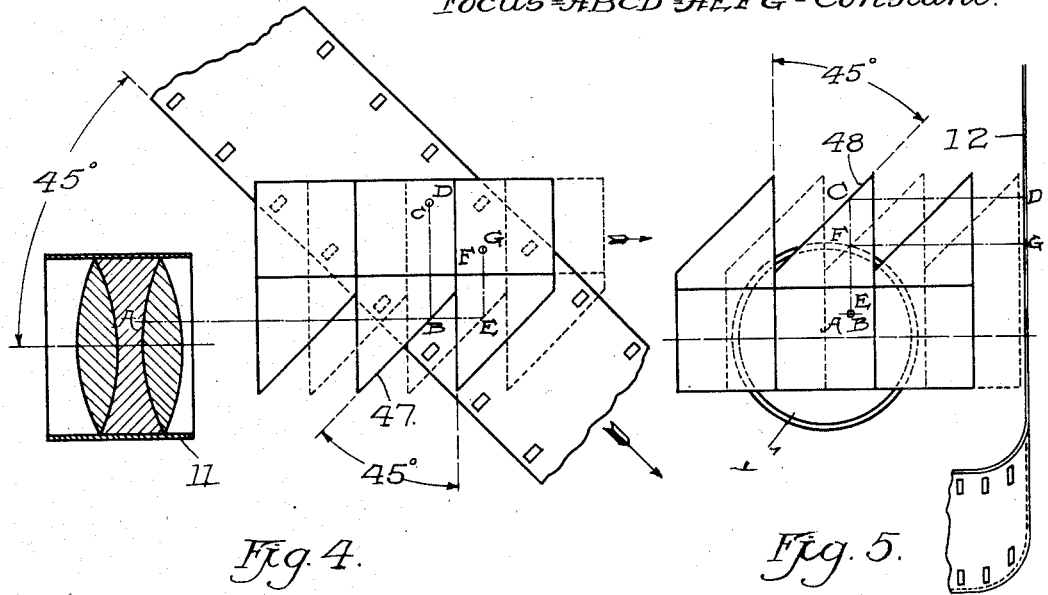

O. R. TAKA.
MOTION PICTURE CAMERA AND PROJECTOR.
APPLICATION FILED MAY 31, 1916.
1,309,665.
Patented July 15, 1919.
4 SHEETS—SHEET 3.
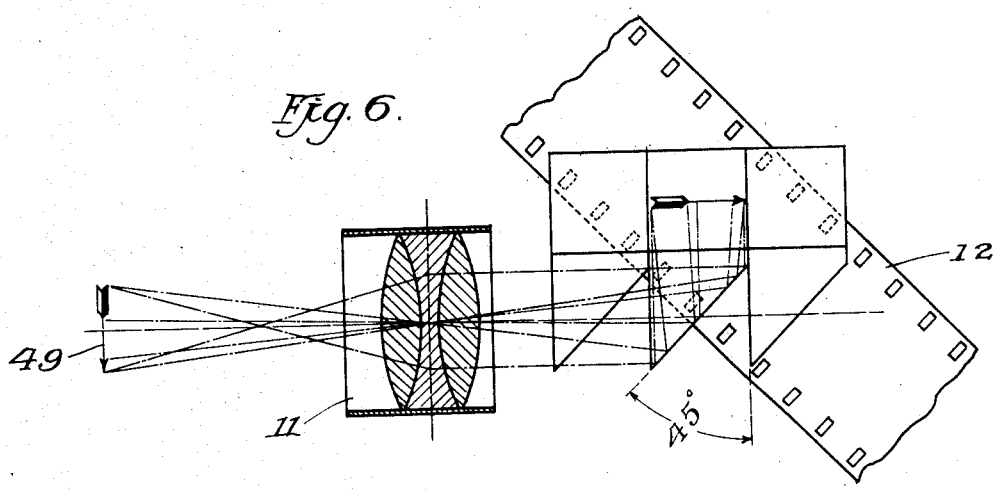
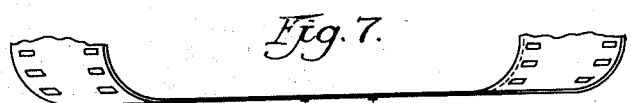
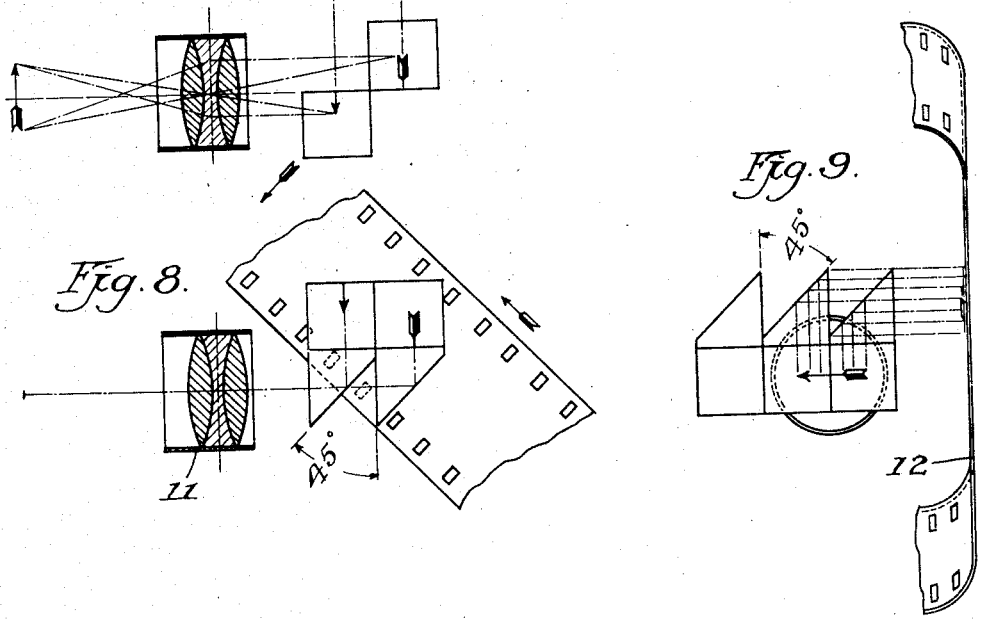
Witnesses
Cecil C. Erickson
F. H. Loveridge
Inventor
Otto R. Taka
By George Bayard Jones
Atty.

O. R. TAKA.
MOTION PICTURE CAMERA AND PROJECTOR.
APPLICATION FILED MAY 31, 1916.

1,309,665.

Patented July 15, 1919.
4 SHEETS—SHEET 4.

Focus = ABCD = EFGH = IKLM = NOPQ = Constant

Witnesses
Cecil C. Erickson
F. H. Loveridge

Inventor
Otto R. Taka
By George Bayard Jones
Atty

UNITED STATES PATENT OFFICE.

OTTO R. TAKA, OF CHICAGO, ILLINOIS.

MOTION-PICTURE CAMERA AND PROJECTOR.

1,309,665.      Specification of Letters Patent.      Patented July 15, 1919.

Application filed May 31, 1916. Serial No. 100,902.

*To all whom it may concern:*

Be it known that I, OTTO R. TAKA, a subject of Finland, residing at Chicago, in the county of Cook and State of Illinois, have invented a certain new and useful Improvement in Motion-Picture Cameras and Projectors, of which the following is a full, clear, concise, and exact description.

My invention relates to improvements in motion picture cameras and projectors.

Attempts have been made heretofore to provide means for moving the image with the film whereby the picture may be taken and the image subsequently projected with a continuously moving film as distinguished from one moving intermittently. In such prior attempts, it has been necessary to employ two sets of reflectors moving independently of each other, but arranged to coöperate so as to impart the desired movement to the image. Such devices have proved unsatisfactory however.

The object of the present invention is to provide improved means for taking pictures and projecting them using a continuously moving film.

In overcoming the objections to prior devices, I employ prisms which have a common support, the prisms of each group being in fixed relation to each other, whereby such great accuracy in the path of travel of the reflectors as has been previously required, is not essential.

Other objects of the invention are to provide a compact apparatus whereby the reflectors may be conveniently mounted and positively driven along a path which bears the proper relation to the lens and to the film.

In the accompanying drawings, I have illustrated several embodiments of the invention which will serve to illustrate the main features thereof. It is to be understood that various other embodiments may be devised.

Figure 1 is a section on the line 1—1 of Fig. 2.

Fig. 2 is a section on a vertical plane through the camera, the mechanism being shown in side elevation.

Fig. 3 is a diagram of the parts arranged as in the side elevation.

Fig. 4 is a diagram of the parts in top plan view.

Fig. 5 is a diagram of the parts in end elevation.

Figs. 6, 7, 8 and 9 are similar diagrammatic illustrations of the apparatus showing the position of the image.

Fig. 10 is a half section and half elevation on an enlarged scale of one of the prism supporting blocks.

Fig. 11 is an end elevation thereof.

Figs. 12, 13 and 14 are side elevation, top plan view and end elevation respectively of the prisms.

Figure 15:
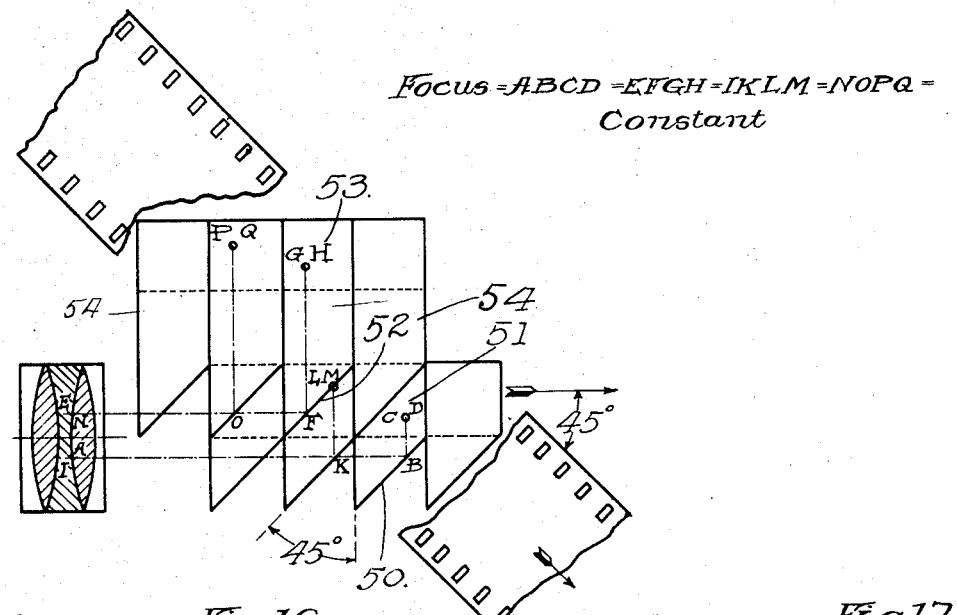
Figs. 15, 16 and 17 are three diagrammatic views of modified apparatus, whereby the image may be printed parallel with the edges of the film.

The camera consists of a suitable inclosure 10 having a lens 11 mounted therein, the film 12 being mounted in any suitable manner and passing through a guide 13 mounted on the partition 14. The foregoing parts may be of any standard construction.

In the inclosure formed within the walls 10, a pair of side plates 15 are mounted, having lugs 16 thereon secured in any suitable manner, as for example by bolts 17, to the structure. A closure 18 is provided which covers the two ends of the elliptical inclosure formed within said side plates and which also closes one side thereof. Said cover is made preferably in a plurality of sections held in place by the studs 19. It is provided with a central channel 20 to provide a suitable clearance for the reflectors hereinafter described. A driving shaft 21 is mounted in the side plates 15 and a similar driven shaft 22 is likewise mounted therein. Each shaft has a pair of gears 23 mounted thereon to turn therewith, said gears overlapping somewhat and being arranged in different planes to prevent interference. Each shaft has a pinion 24 mounted on one end thereof with an intermediate pinion 25, whereby one shaft may be driven by the other. Said intermediate pinion is mounted on a stud 26 secured to one of the side plates 15. Two pairs of idlers 27 are mounted on suitable pins 28 carried in said side frames, said idlers being adjacent to the gears 23, but not in the same plane therewith.

The purpose of the various gears and pinions just described, is to provide for the continuous movement of the series of V-shaped blocks 30 along an elliptical path, after the manner of an endless belt. Said blocks are not connected to each other but each has end plates 31 provided with a pair of projecting pins 32, which pins fit within the teeth of the gears 23 or of the idlers 27. Said pins have rollers 33 thereon received within a pair of elliptical grooves, each groove being formed between a flange 34 on the cover plates 20 and inner plates 35, the latter being secured by screws 36 to sleeves 37 which surround the respective shafts 21, 22 having an anti-friction bushing 38 interposed between the two. By rotating the driving shaft 21, by means of a suitable handle 39 for example, or other suitable means, the blocks are made to follow an elliptical path moving in the direction shown by the arrow in Fig. 2, namely along a path at an angle of 45° with the lens and with the plane of the film. The side of the inclosing framework toward the lens is partially covered by a plate 40 having a central opening, whereby the light passing through the lens may fall on said blocks without obstruction.

In the trough in each block, prisms 45, 46 are mounted as shown in Fig. 1. The shape of said prisms will be clear from an inspection of Figs. 12, 13 and 14. The prisms are so arranged that the rays of light from the lens fall first on the prism 45, being reflected thereby at an angle of 45° to the reflecting surface or at an angle of 90° to the rays themselves, onto the prism 46, which in turn deflects said light at an angle of 90° directing it against the film through an opening in the guide 13.

Each reflecting unit is made up of two prisms for convenience in manufacture and assembly, but said units may be made as a single unitary prism or glass member if desired.

The film is moved continuously at a uniform rate by any suitable mechanism. It moves at the same rate of speed as the prisms. The arrangement will be better understood from an inspection of the diagrammatic views.

In Figs. 3, 4 and 5 for example, the light passes through the lens 11 and is reflected by the surface 47 to the surface 48, which reflects it to the film 12, the points B and C indicating the points of contact of the ray of light with the reflecting surfaces of the prisms. With the arrangement described, it will be seen that the image travels with the film. By reference to the points D and G, it will be seen that the focal distance remains constant since the distance from A to B plus B to C and C to D is the same as the distance from A to E, plus E to F, and F to G. It will therefore be seen that regardless of the movement of the reflectors and of the film, the focal distance remains constant.

In Figs. 6, 7, 8 and 9, the arrow 49 indicates the image which is shown as falling on the sensitized film in two detached parts, as in Fig. 8. The arrow is also arranged diagonally with respect to the film. In fact, with the mechanism thus far described, the pictures will all be arranged diagonally on the film instead of transversely across it. As the film moves in the direction shown by the arrow, in Fig. 8, the tail of the arrow grows larger and the head grows smaller, the images thus being formed on the film in two separate sections, one-half of the picture being indicated to the right and the other half to the left in said figure. The images are thus formed continuously, but by two separate sets of reflectors, each of which forms a complete image.

Figure 16:
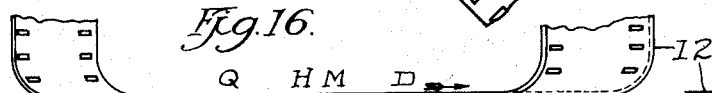
Figure 17:
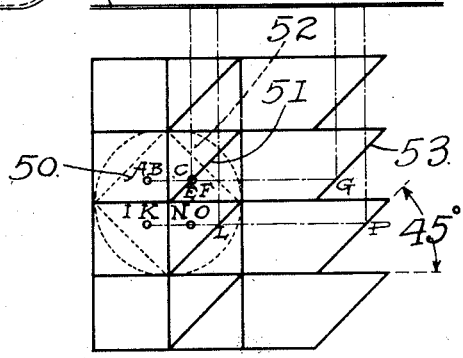

In Figs. 15, 16, and 17 mechanism is illustrated diagrammatically, whereby the pictures may be printed on the film parallel therewith instead of diagonally.

For this purpose the prisms are mounted in groups of four instead of in groups of two. In other words, each of the blocks 30 would support four prisms arranged as shown in said Figs. 15, 16 and 17.

Such a group is indicated by references 50, 51, 52 and 53. The path taken by the rays of light is indicated by the dotted lines A B C D; E F G H; I K L M and N O P Q. It will be seen that no matter which group of prisms the light passes, the focus remains constant, even with the prisms moving in the direction indicated by the arrows in the respective figures. The pictures are taken in two halves in this case. In Fig. 17 the aperture is indicated as being square. One-half of the picture is represented by the light passing through the left hand side of the aperture and the other half of the picture is represented by the light passing through the other half of this aperture. In other words, the light for one-half of the picture passes through the prisms 50, 51, the light for the other half passing through prisms 52, 53. In both of the above described arrangements of prisms, the pictures may be printed so that they may be reproduced in natural colors. This may be effected by inserting the necessary color screen between the two prisms of a pair, as shown in Fig. 12 for example, in which the prisms are spaced apart to provide a small slot between them. Where such color screens are not used, spacing is unnecessary. These screens permit color photography by means of the well known three color process.

With the second form of apparatus described, where four prisms are used, it is to be understood that the light is deflected but twice, two prisms of each group cooperating to project simultaneously two different parts of the image on the film at two different places thereon. In the first form of device illustrated, where two prisms are used in each group, the image is also printed on two different parts of the film, as indicated by the arrow, previously described. The exposure for each area increases from one side to the other until the entire area is covered by the image, whereupon the exposed area decreases in such manner that the total exposure for any given point is the same as for any other given point.

As seen in Fig. 15, a series of transparent cubes 54 are arranged adjacent to and preferably integral with certain of the prisms. Said cubes need not be integral however. The object of this arrangement is to avoid an air gap through which the light rays would otherwise have to pass. Such an air gap would deflect the rays thereby preventing the attainment of a constant and uniform focus at all points of the area covered by the image.

The advantages of the construction illustrated herein are that pictures may be taken and projected with a speed about three times as great as the present speed, which is about sixteen exposures per second. Furthermore, the pictures are smoother and flickering is avoided. Also the film lasts longer, due to the decreased wear and tear thereon. The apparatus is also well adapted to color photography.

It is apparent that the illustrations employed herein are intended in a descriptive and not in a limiting sense, since various other forms of the invention may be devised which fall within the scope of the appended claims.

Having thus described my invention, what I claim as new and desire to secure by Letters Patent of the United States is:

1. In a device of the class described, a plurality of reflecting units each having two reflecting surfaces, each of which surfaces is inclined at an angle of 45° with respect to a common plane, one inclined surface in each unit being turned 90° from the other.

2. In combination, a stationary lens, a movable film, a single series of reflecting units arranged to move in a closed path in such relation to said lens and said film as to maintain a constant focal distance from said lens to said film, each unit comprising two reflecting surfaces inclined at an angle of 45° with respect to a common plane, one inclined surface in each unit being turned 90° from the other.

3. In a device of the class described, a movable film, a series of reflecting units each comprising two reflecting surfaces inclined at an angle of 45° with respect to a common plane and intersecting said plane in lines forming an angle of 90° with each other, means for moving said film, and means for moving said units at a rate proportional to the movement of said film.

4. In a device of the class described, a movable film, a single series of reflecting units, means for moving said film, and means for moving said units in a straight line at an angle of 45° with reference to the plane of said film, said units each comprising two reflecting surfaces, the intersection of said surfaces with said common plane forming a 90° angle.

5. In a device of the class described, a pair of rotatable shafts, two gears mounted on each shaft, the gears on each side being out of alinement and overlapping each other, a driving gear on each shaft, an intermediate gear meshing with said driving gears, additional gears adjacent to said first mentioned gears, a series of blocks having pins projecting from opposite sides thereof far enough to fit within the teeth of said first mentioned gears, and reflectors carried by said blocks.

6. In a device of the class described, a pair of rotatable shafts, two gears mounted on each shaft, the gears on each side being out of alinement and overlapping each other, a driving gear on each shaft, an intermediate gear meshing with said driving gears, additional gears adjacent to said first mentioned gears, a series of blocks having pins projecting from opposite sides thereof far enough to fit within the teeth of said first mentioned gears, reflectors carried by said blocks, guide plates spaced from each other forming a slot within which said pins are received, and means for operating said foregoing parts to cause said blocks to travel in a closed path.

7. In a device of the class described, a pair of rotatable shafts, two gears mounted on each shaft, the gears on each side being out of alinement and overlapping each other, a driving gear on each shaft, an intermediate gear meshing with said driving gears, additional gears adjacent to said first mentioned gears, a series of blocks having pins projecting from opposite sides thereof far enough to fit within the teeth of said first mentioned gears, reflectors carried by said blocks, guide plates spaced from each other forming a slot within which said pins are received, means for operating said foregoing parts to cause said blocks to travel in a closed path, a lens arranged at an angle of 45° to the path of travel of said reflectors, and a film arranged to move in a plane at right angles to the plane of said lens.

8. In a device of the class described, a plurality of trough-shaped blocks, means for moving said blocks and a plurality of reflecting prisms received within each trough.

9. In a device of the class described, a plurality of blocks having right-angled recesses therein, and a plurality of reflecting prisms each having a portion fitted within said recesses.

10. In a device of the class described, a series of supporting members, reflecting prisms supported therein in pairs, the prisms of each pair consisting of two similar triangular prisms arranged back to back and turned at an angle of 45° with respect to the path of travel thereof.

11. In a device of the class described, a lens, a film moving in a plane at right angles to the plane of said lens, and a series of groups of reflecting prisms moving in a path at angles of 45° to both of said planes, said prisms being arranged in groups of four with their reflecting surfaces so disposed as to cause said image to travel with said film and to print thereon in parallel relation thereto.

In witness whereof I hereunto subscribe my name this 29th day of May A. D., 1916.

OTTO R. TAKA.